US012554082B2

(12) United States Patent
Jacques et al.

(10) Patent No.: US 12,554,082 B2
(45) Date of Patent: Feb. 17, 2026

(54) BOTTOM SIDE AIR FLOW FOR OPTICAL MODULE AND CAGE

(71) Applicant: Cisco Technology, Inc., San Jose, CA (US)

(72) Inventors: Joseph F. Jacques, Austin, TX (US); Mark C. Nowell, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 342 days.

(21) Appl. No.: 18/308,951

(22) Filed: Apr. 28, 2023

(65) Prior Publication Data

US 2023/0350143 A1   Nov. 2, 2023

Related U.S. Application Data

(60) Provisional application No. 63/364,013, filed on May 2, 2022.

(51) Int. Cl.
*G02B 6/42* (2006.01)

(52) U.S. Cl.
CPC ........... *G02B 6/4269* (2013.01); *G02B 6/426* (2013.01); *G02B 6/4277* (2013.01); *G02B 6/4284* (2013.01)

(58) Field of Classification Search
CPC ............................ G02B 6/4269; G02B 6/4277
See application file for complete search history.

(56) References Cited

U.S. PATENT DOCUMENTS

| 7,178,991 | B2* | 2/2007 | Chiu ................... G02B 6/4246 385/88 |
| 2016/0211623 | A1 | 7/2016 | Sharf et al. |
| 2018/0338387 | A1 | 11/2018 | Park et al. |
| 2020/0076455 | A1 | 3/2020 | Sharf |
| 2021/0231890 | A1 | 7/2021 | Chopra et al. |
| 2022/0269019 | A1 | 8/2022 | Edwards, Jr. et al. |

OTHER PUBLICATIONS

Brian Park et al., "Specification for OSFP Octal Small Form Factor Pluggable Module," OSFP MSA, Dated: Oct. 2, 2022, pp. 1-131.

* cited by examiner

*Primary Examiner* — John Bedtelyon
(74) *Attorney, Agent, or Firm* — Patterson + Sheridan, LLP

(57) ABSTRACT

The module device assemblies and systems described herein provide for increased cooling airflow through electronic devices via airflow channels. The module device assemblies also prevent radiation or other noise from emitting through the device assemblies using electromagnetic compatibility (EMC) shields.

20 Claims, 15 Drawing Sheets

BOTTOM SIDE AIR FLOW FOR OPTICAL MODULE AND CAGE

CROSS-REFERENCE TO RELATED APPLICATIONS

This application claims benefit of U.S. provisional patent application Ser. No. 63/364,013 filed May 2, 2022. The aforementioned related patent application is herein incorporated by reference in its entirety.

TECHNICAL FIELD

Embodiments presented in this disclosure generally relate to providing airflow and cooling in and through computer systems such as data center switches and storage systems. More specifically, embodiments disclosed herein describe module assemblies, such as pluggable optical modules, which provide efficient air cooling flows throughout the computer systems.

BACKGROUND

In large scale computing environments, such as data centers, large numbers of computing systems are grouped together in racks or other assemblies. These computing systems produce large amounts of heat during operation and, in turn, cooling systems provide cooling airflows to and through the components of the computing systems. As computer systems increase in power and complexity, the heat output of these systems also increases.

As power density in optical modules continues to increase, optical modules used in various systems and network equipment are becoming more difficult to cool. Data rates supported by optical modules have increased, which has led to an increase in energy consumption by the optical modules. This in turn results in greater heat dissipation from the optical modules. As demand rises for even higher data rates, air cooling pluggable optical modules with conventional cage designs has become more and more challenging.

Additionally, the electronic components of the computing systems also produce electromagnetic radiation or noise. As the power and complexity of the computer systems increase, the related radiation produced by each component in the system increases. While computing systems typically have enclosed chassis which may prevent some portion of the radiation/noise produced by the electronic components from interfering with other closely situation computing systems, certain areas of the chassis, including air vents, may allow for radiation to exit the chassis and potentially interfere with other computing systems in the large scale computing environment.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
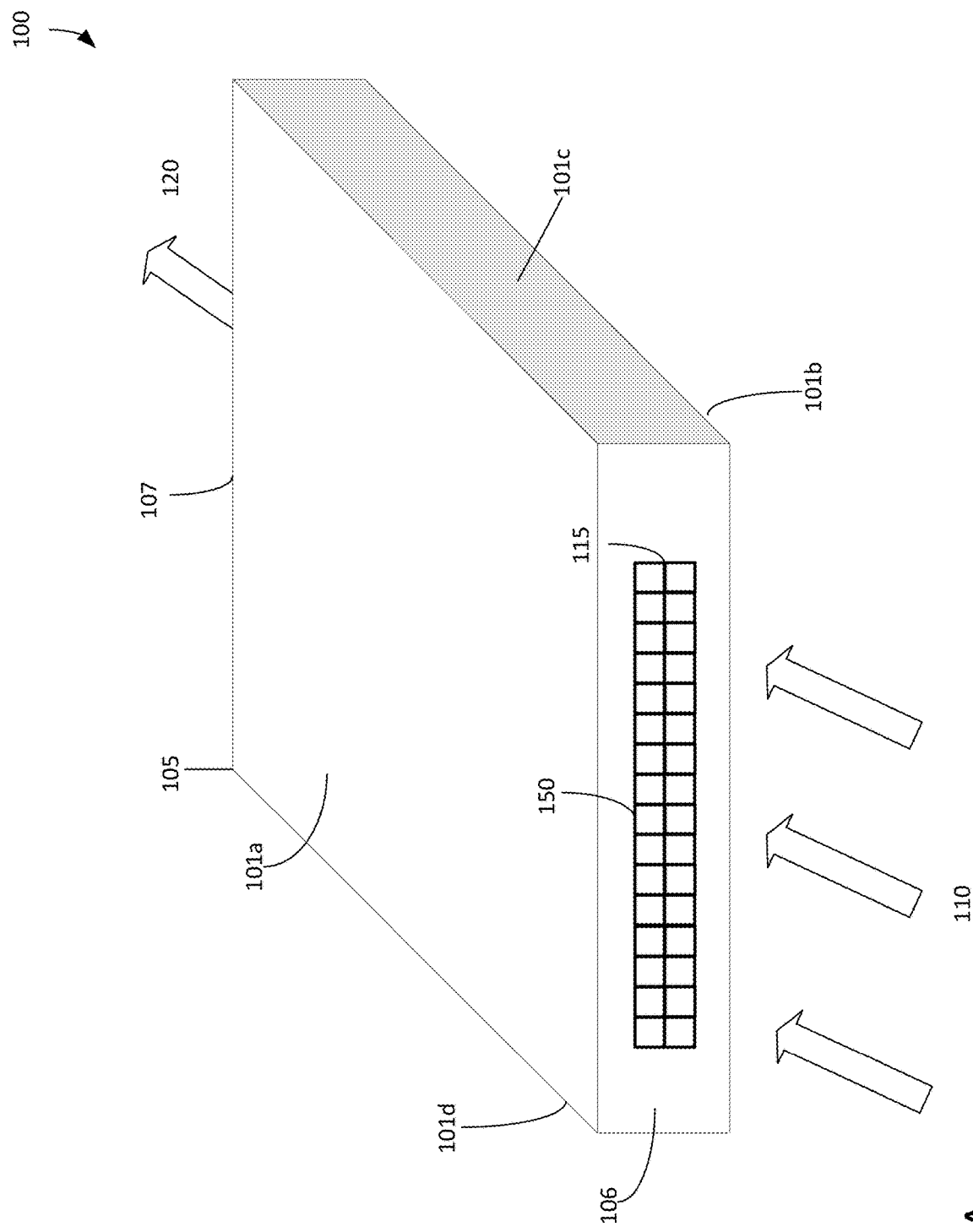
FIGS. 1A and 1B illustrate perspective views of an electronic device system, according to one embodiment.

One example embodiment includes a module assembly. The module assembly includes a module cage. The module cage may include a first cage sidewall with an intake notch formed through the first cage sidewall on a first side of the first cage sidewall, a second cage sidewall, and an exhaust sidewall. The first cage sidewall, the second cage sidewall, and the exhaust sidewall define an interior cavity. The module assembly also includes a module device positioned in the interior cavity of the module cage. The module device include a first recessed portion formed on a first module sidewall of the module device opposite, where a first airflow channel is formed from the intake notch and between the first recessed portion and the first cage sidewall; and a second recessed portion formed on a second module sidewall of the module device, where a second airflow channel is formed between the second recessed portion and the second cage sidewall, where the first airflow channel and the second airflow channel provide a cooling airflow path from the intake notch to the exhaust sidewall.

One example embodiment includes a system. The system includes a chassis and an external connection system positioned on a first end of the chassis. The external connection system includes a faceplate with a module opening formed through the faceplate, and a vent opening formed through the faceplate and positioned adjacent to the module opening. The system also includes a mounting platform comprising a vent notch formed on the mounting platform, where the vent notch is positioned adjacent to the vent opening and a module assembly positioned in the module opening of the faceplate and attached to the mounting platform. The module assembly includes a module cage. The module cage may include a first cage sidewall with an intake notch formed through the first cage sidewall on a first side of the first cage sidewall, a second cage sidewall, and an exhaust sidewall. The first cage sidewall, the second cage sidewall, and the exhaust sidewall define an interior cavity. The module assembly also includes a module device positioned in the interior cavity of the module cage. The module device include a first recessed portion formed on a first module sidewall of the module device opposite, where a first airflow channel is formed from the intake notch and between the first recessed portion and the first cage sidewall; and a second recessed portion formed on a second module sidewall of the module device, where a second airflow channel is formed between the second recessed portion and the second cage sidewall, where the first airflow channel and the second airflow channel provide a cooling airflow path from the intake notch to the exhaust sidewall.

One example embodiment includes a module assembly. A module assembly includes a module cage, and a module device positioned in an interior cavity of the module cage. The module device includes a heatsink positioned on a first module sidewall of the module device. The heatsink includes a series of fins; and at least one electromagnetic compatibility (EMC) shield positioned between fins of the series of fins.

Example Embodiments

Large scale computer systems are an increasingly utilized form of providing networked computing and storage solutions. For example, large scale data centers provide both primary and redundant computing and storage options for a variety of services including governmental, commercial, and consumer computer network based services. A primary concern for data centers and large scale computer systems is providing efficient cooling to these systems. Failing to keep the individual computer systems cool can cause decreased performance and damage to the computer systems. In some examples, data centers are designed to provide cooling airflow to each of the equipment racks and the individual computer systems. The individual computer systems in turn include individual cooling systems, such as fans and air vents, which move cooler ambient air through the computer system to cool the heat producing internal components of the computer system.

Cooling system designers are incentivized to provide as much as possible in an efficient way in order to cool the heat producing components. This may include enlarging openings in the chassis of the computer systems to provide a larger pathway for air to enter and exit the enclosed chassis of the computing system. However, other concerns and design restrictions limit the design of associated air vent panels in the computing systems.

For example, as the processing power of the individual computer systems increases, the amount of electromagnetic energy radiation (noise) produced by the electronic components increases. In some examples, the noise from one computer system may cause electromagnetic interference (EMI) to other computer systems or electronic devices. While EMI may cause limited interference in computer systems which are spaced apart or in individual configurations, in a large scale computing environments, mitigating EMI becomes an essential concern for the various systems in the environment to function.

In some cases, legal regulations and standards define an electromagnetic compatibility (EMC) for electronic devices (including computing systems) which limits an amount of radiation or noise that a given electronic device may produce or emit into the environment. Providing an efficient airflow to heat producing components in a computer system while also meeting EMC regulations and reducing the amount of radiation that emits from the computer systems remains a challenge.

The pluggable electronic devices described herein provide for a pluggable optics module with an airflow path through parts of the pluggable module and EMC protection device as described in more detail herein.

Figure 1B:
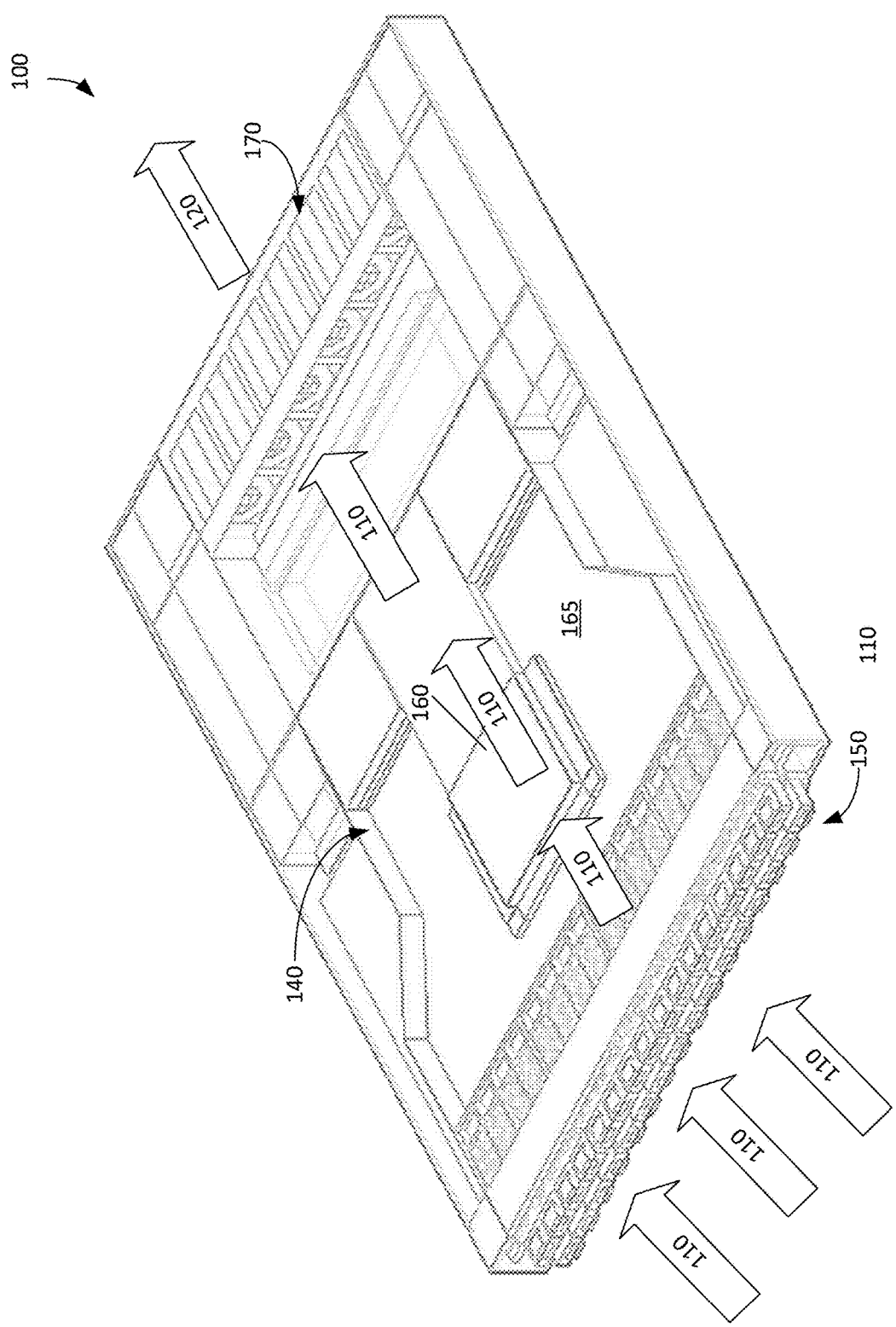

FIGS. 1A and 1B illustrate perspective views of an electronic device system 100, according to one embodiment. The system 100 may be embodied as a network device, including a network switch, network storage device (server), or other type of electronic device. FIG. 1A is an external perspective view of the system 100 and FIG. 1B is a perspective view of internal components of the system 100. In some examples, the system 100, is installed within a server rack, where cooling air is drawn into the system 100 via an air vent panel 115 and an array 150 which includes various communication or connection devices (such as pluggable optical modules etc.) A cooling system airflow 110 enters the system 100 via the air vent panel 115 and provides a cooling airflow to devices and components positioned within an interior of the system 100 as described in more detail herein.

In some examples, the system 100 includes an enclosed chassis 105 which provides a housing for electronic, optical, and opto-electronic devices and other components of the system 100. The chassis 105 includes sidewalls 101a-101d, an external connection system which includes an intake faceplate 106 and the air vent panel 115, and an exhaust face 107. In some examples, the sidewalls 101a-101d, the intake faceplate 106, and the exhaust face 107 forms an internal portion or interior 140 (shown in FIG. 1B) and serves as a platform and housing for various devices of the system 100 (as described in more detail in relation to FIG. 1B). For example, a heat generating system component such heat producing component 160 may be mounted on platform 165 (e.g., a printed circuit board (PCB) or other mounting platform in the interior 140.

In some examples, the intake faceplate 106 includes a solid sidewall section, air vent panel 115 and the array 150. The back sidewall 102 may also include a solid section and air vents (or air exhaust vents) to provide an exit from the system 100 for the exhaust flow 120 from an array of fans 170. In some examples, the system 100 is a computer system including various electronic, optical, and opto-electronic devices. For example, the system 100 may be a server, router, or other computing device in a large scale computing system (e.g., a data center). As shown in FIG. 1B, the system 100 includes several devices housed within a chassis 105 such as heat producing components 160, among other devices, etc.

In some examples, the array 150 includes one or more pluggable optical modules in module assemblies as described in more detail herein. The cooling system airflow 110 enters the system via the air vent panel 115 and flows around the array 150. In some examples, the cooling system airflow 110 cools the devices of the array 150 and the various other heat producing components. For example, the cooling system airflow 110 enters the system 100 via intake face 106 and exits the system 100 as exhaust flow 120 via the exhaust face 107 and cools the heat producing components 160 and other parts of the system 100.

In some examples, the cooling system airflow 110 enters via openings in the intake face such as openings associated with the array 150 as shown in FIGS. 2A-9D. In order to provide increased cooling through the array 150, the various modules described herein provide for increased airflow into the interior 140 while preventing EMI and other noise from exiting the system 100.

Figure 2A:
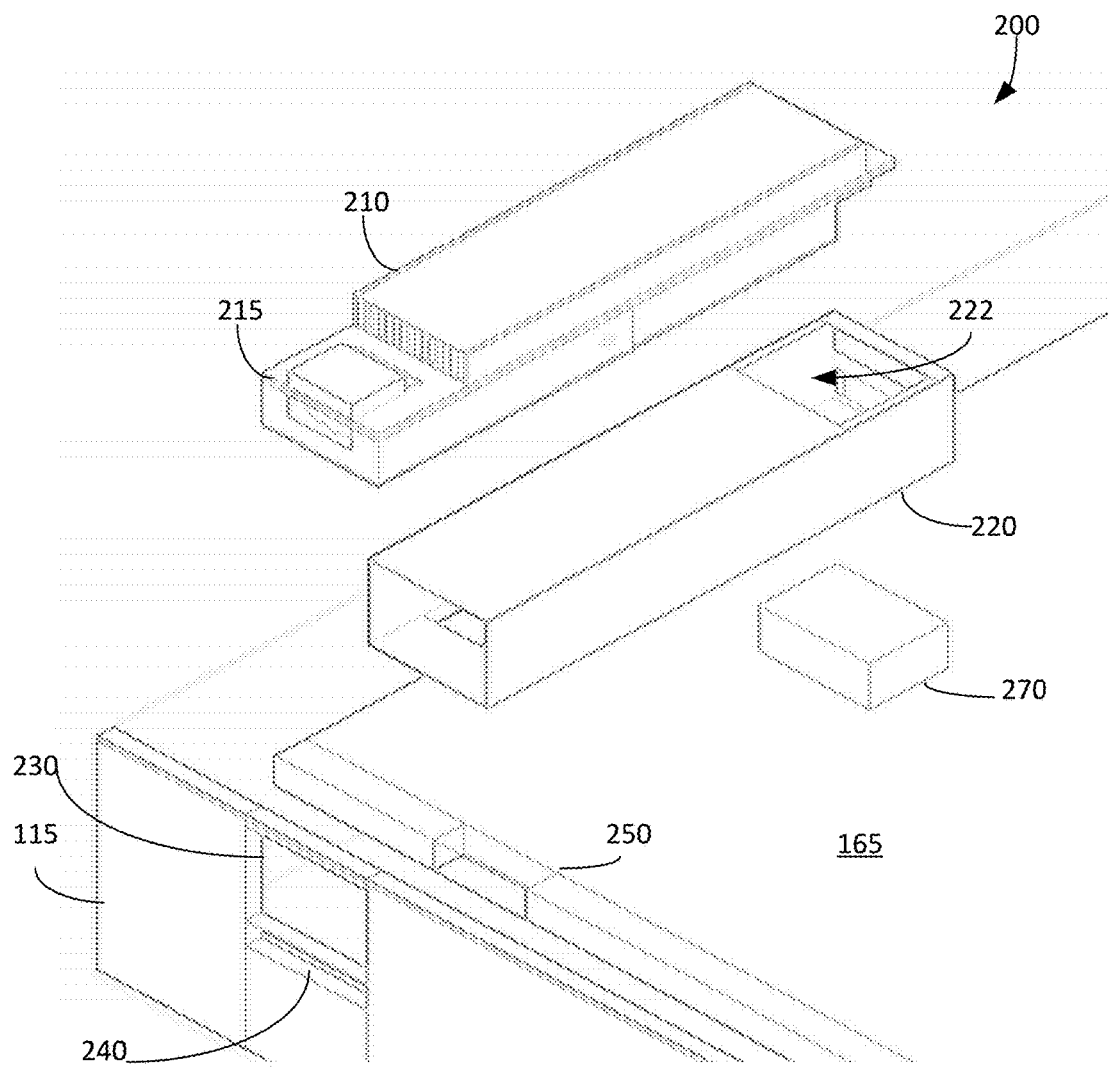
FIGS. 2A-C illustrates various views of a pluggable module assembly 200 with bottom side airflow, according to one embodiment.
Figure 2B:
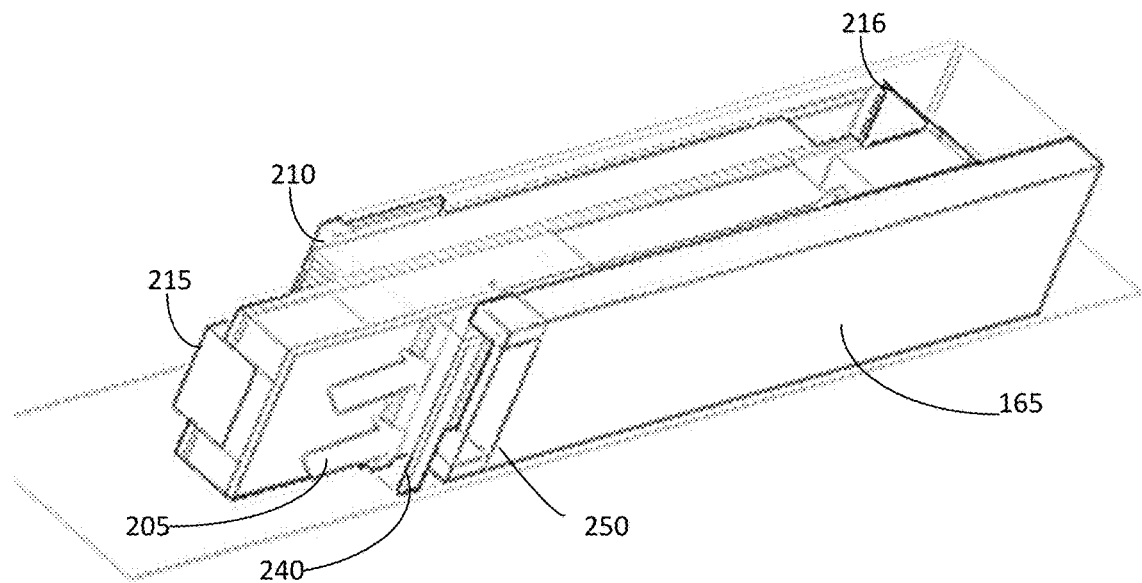
Figure 2C:
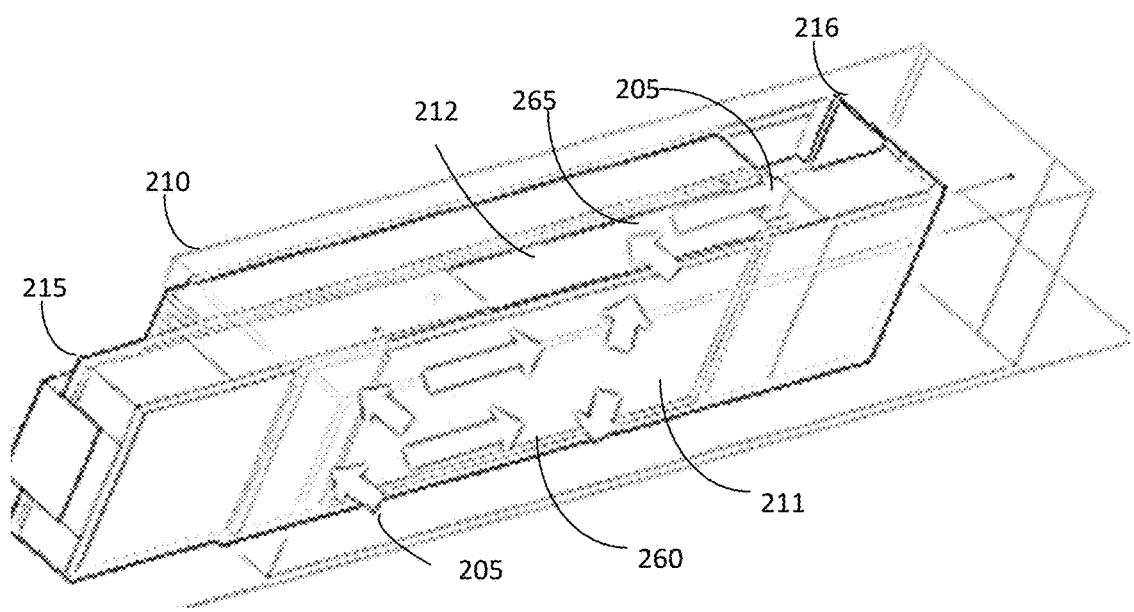

FIGS. 2A-C illustrates various views of a pluggable module assembly 200 with bottom side airflow, according to one embodiment. As shown in an exploded view in FIG. 2A, the assembly 200 includes a module device 210 and a module cage 220. The module cage may include cage sidewalls forming an interior cavity 222. In some examples, the module device 210 is positioned in the interior cavity of the module cage 220 as shown in more detail herein. In some examples, an in place arrangement of the assembly 200 includes the module device 210 positioned on the mounting platform 165 such that the module device 210 is connected to interconnects 270 and attached/mounted on the mounting platform 165. The module device 210 is also positioned over a base notch 250 formed in the mounting platform 165 which provides for airflow to enter the module cage 220 and recessed portions of the module device 210 as described in more detail herein in FIGS. 2B-C and 3A-B.

In some examples, a portion 215 of the module device 210 is positioned through a module opening 230 in the air vent panel 115 to provide for optical or other connections to be connected to the module device 210 and the system 100 (via the module device 210). In order to provide increased airflow through the assembly 200 and the system 100 overall, the air vent panel 115 also includes a vent notch 240 formed through the air vent panel 115 and positioned adjacent to the module opening 230. In some examples, the module device 210 completely fills the module opening 230, and the vent opening 240 allows for additional airflow to flow through the base notch 250, the module cage 220, and the module device 210 to provide additional cooling to heat producing components in the module device 210 and to heat producing components 160 in the interior 140 as shown in FIG. 1B. Additional details airflow through the assembly 200 are shown in FIGS. 2B and 2C.

FIG. 2B is a bottom side perspective view of the module device 210 attached to the platform 165, and shown without the module cage 220. FIG. 2C is a bottom side perspective view of the module device 210, shown without the platform 165 and without the module cage 220. In the example shown in FIGS. 2B and 2C, the module device 210 includes recessed portions including recessed surface 211 and recessed surface 212 which creates an airflow channels 260 and 265 between the recessed portions of the module device 210 and the module cage 220 shown in FIG. 2A. A cooling airflow 205 flows through the airflow channel 260 from the vent opening 240 through the base notch 250 into the recessed surface 211. The cooling airflow 205 also flows through airflow channel 265, from the recessed surface 211 through the recessed surface 212, and exits the airflow channel(s), formed between the module device 210 and the module cage 220, via an exhaust sidewall 216. The cooling airflow provides increased amounts of cooling air to the interior 140 shown in as shown in more detail in relation to FIG. 4.

Figure 3A:
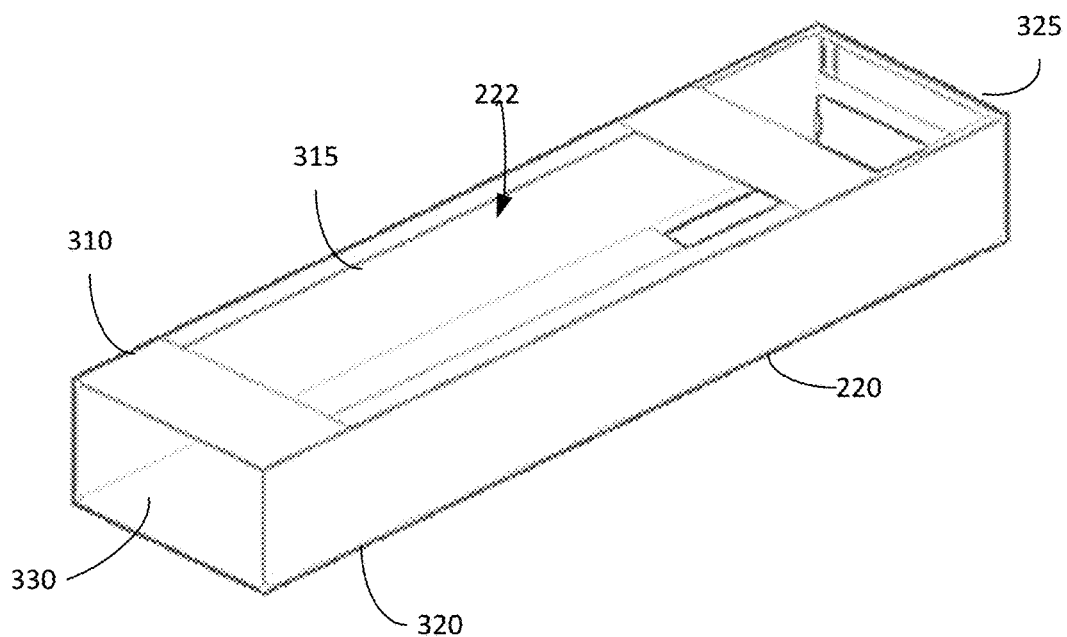
FIG. 3A is a bottom perspective view of a module cage, according to one embodiment.

FIG. 3A is a bottom perspective view of the module cage 220 of the assembly 200. The module cage 220 includes a first cage sidewall 310 and an intake notch 315 formed through the first cage sidewall 310 on a first side of the first cage sidewall 310. In some examples, when assembled, the intake notch 315 is aligned with the notch 250 in FIG. 2A in order to provide the cooling airflow 205 shown in FIGS. 2B and 2C. The module cage 220 also includes a second cage sidewall 320 and an exhaust sidewall 325. In some examples, the first cage sidewall 310, the second cage sidewall 320, and the exhaust sidewall 325 define the interior cavity 222 where the module device 210 is positioned within the module cage 220 when assembled together. The module cage 220 may also include module opening 330 where a portion of the module device 210 is positioned in the opening. For example, the module device 210 may be positioned in the interior cavity 222 and module cage 220 such that the portion 215 extends through and past the module opening 330 as shown in more detail in FIG. 4.

Figure 3B:
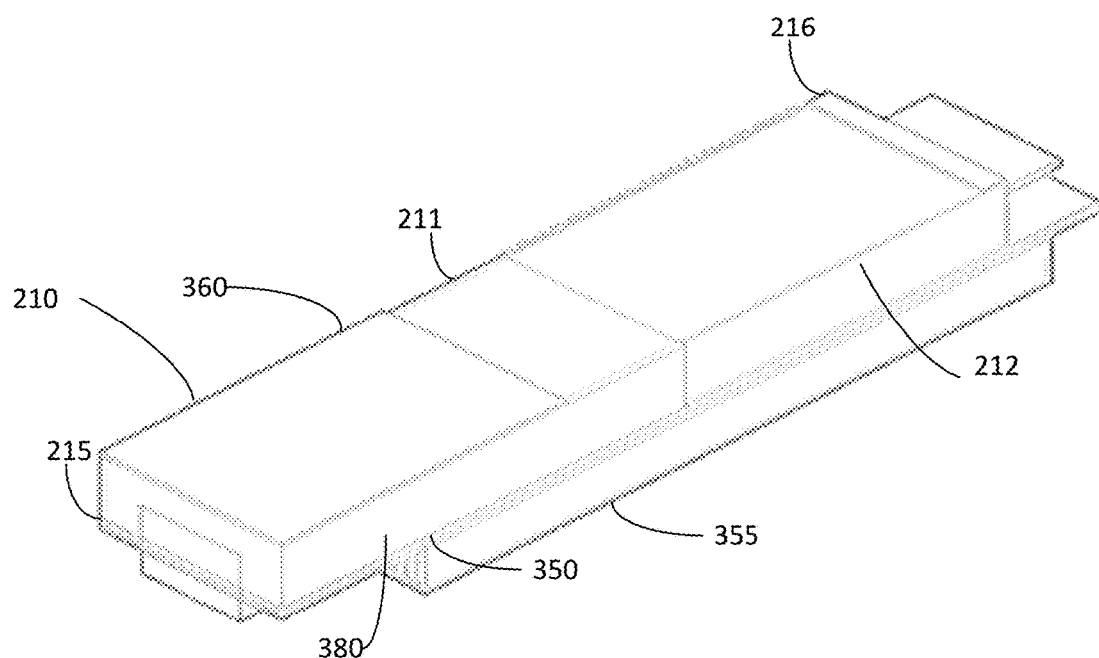
FIG. 3B is a bottom perspective view of a module device, according to one embodiment.

FIG. 3B is a bottom perspective view of the module device 210 of the assembly 200. As described above, the module device 210 device may be positioned in the interior cavity 222 of the module cage 220. The module device 210 may also include a heatsink 355 positioned on a first module sidewall or top sidewall 350 of the module device 210. Also, as described above, the module device 210 includes a first recessed surface 211 formed on a second module sidewall, or bottom sidewall 360, where the bottom sidewall 360 is opposite top sidewall 310. In some examples, the first recessed surface 211 is recessed at a first distance, such as 0.25 millimeters (mm) from the bottom sidewall 360. In some examples, a first airflow channel, airflow channel 260 is formed from the base notch 250 shown in FIGS. 2A-2B and between the first recessed surface 211 and the first cage sidewall 310.

In some examples, the module device 210 also includes the second recessed surface 212 formed on a third module sidewall, or sidewall 380 of the module device 210. In some examples, the second recessed surface 212 is recessed at a second distance, such as 0.55 from the sidewall 380. A second airflow channel, the airflow channel 260 is formed between the second recessed surface 212 and the second cage sidewall 320, where the first airflow channel and the second airflow channel provide a cooling airflow path from the intake notch to the exhaust sidewall.

Figure 4:
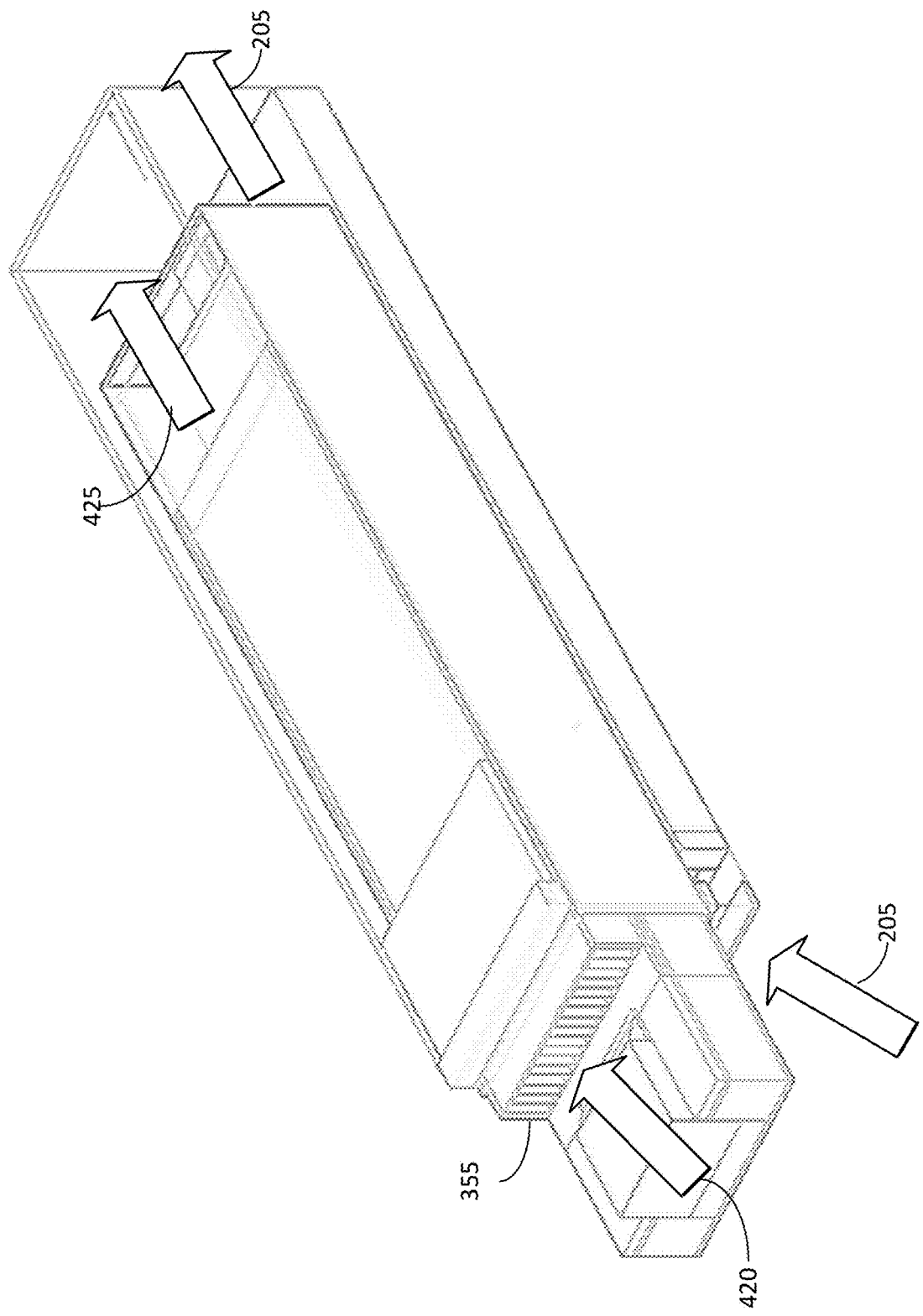
FIG. 4 is a top side perspective view of a module device mounted on platform, according to one embodiment.

FIG. 4 is a top side perspective view of the module device 210 of the assembly 200 mounted on the platform 165. In some examples, the heatsink 355 provides primary heat mitigation and cooling to any heat producing components in or on the module device 210. For example, optical, electronic, or opto-electronic components located in the module device 210 may provide communication and other functions in the module device 210. During operation these components produce heat and are cooled by the heatsink 355. The heatsink 355 is cooled by airflow 420 which flows through the fins and other components of the heatsink 355 and exits the heatsink 355 and the module device 210 as exhaust 425. In some examples, the exhaust 425 is a higher temperature than the airflow 420 which may be at an external ambient temperature. Additionally, the airflow 420 may be impeded by the components (e.g., the fins etc.) of the heatsink 355, which decreases a cooling ability of the overall system 100. As discussed above, without additional cooling airflow from the air vent panel 115 into the interior 140, various components such as heat producing components 160 may become overheated during operation.

As described above, the cooling airflow 205 primarily provides heat mitigation to external devices outside of the module device 210 and flows through module cage 220 and module device 210 assembly via the air flow channels described in FIGS. 3A-3B in order to provide additional cooling airflow into the interior 140. In some examples, the cooling airflow 205 is a same or similar temperate as the external ambient temperature of the cooling airflow 420 entering the heatsink and a lower temperature than the exhaust 425 such that the cooling airflow 205 provides additional cooling to the interior 140 and the heat producing components. In some examples, the module device 210 may include additional cooling features in addition or instead of the heatsink 355 as shown in FIGS. 5A-5B, FIGS. 6A-C, and FIGS. 7A-B.

Figure 5A:
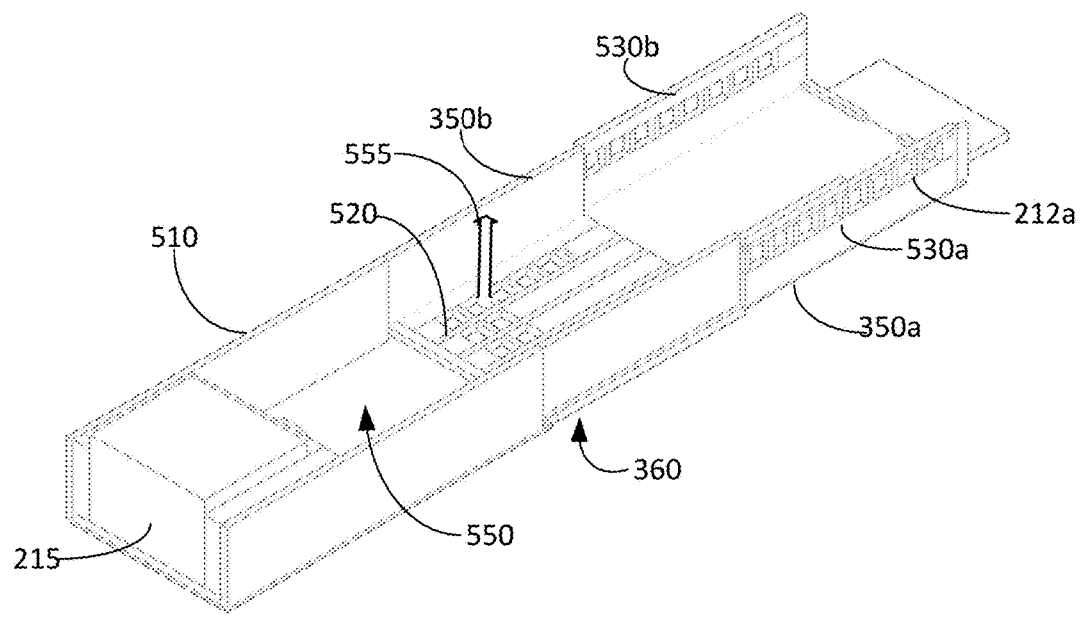
FIG. 5A-B illustrate various views of a module device according to one embodiment.
Figure 5B:
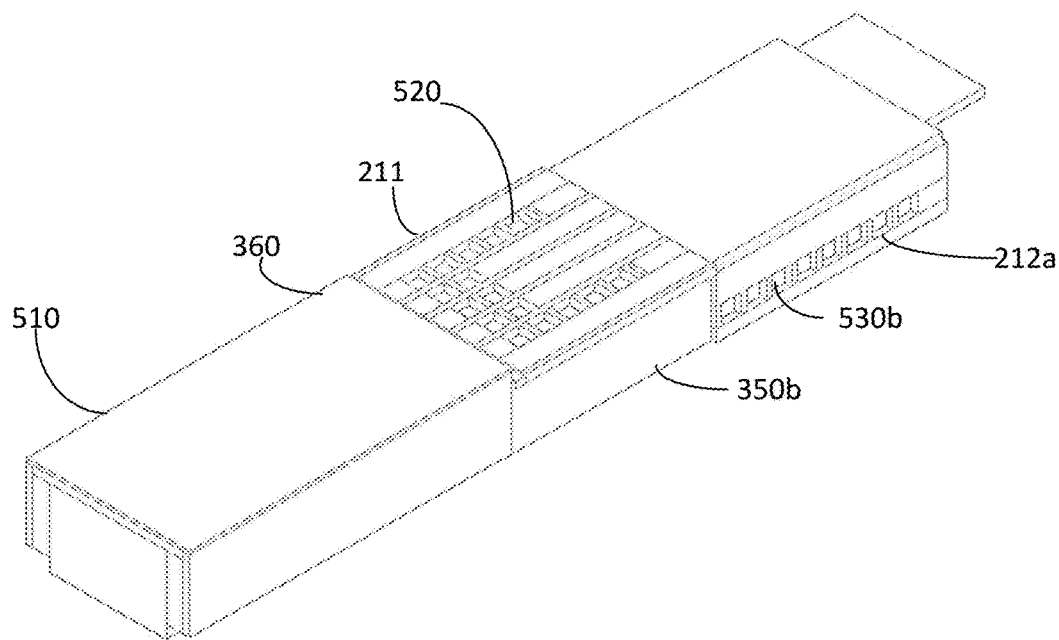

FIG. 5A is a top perspective view and 5B is a bottom perspective view of a case 510 of the module device 210. In this example, the case 510 includes bottom sidewall 360 with the recessed surface 211 and sidewalls 350a and 350b (similar to the sidewall 350 of FIG. 3B) with the recessed surfaces 212a and 212b. In order to provide additional cooling to airflow to an interior of the module device 210, the recessed surfaces 211, 212a and 212b may include vent holes, such as vent holes 520, 530a and 530b formed through the respective sidewall materials. The various vent holes provide for the cooling airflow 205 to enter an interior 550 of the module device 210 and provide cooling airflow 555 to any components located within the module device 210 as it passes through the respective air flow channels between the recessed portions and the module cage 220.

Figure 6A:
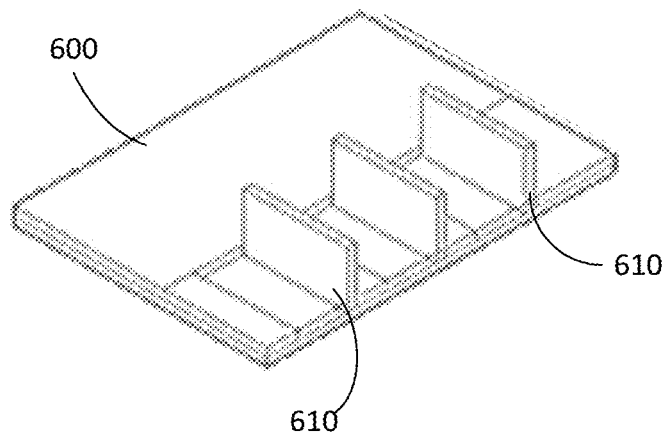
FIGS. 6A-C illustrate an EMC shield for a module device, according to various embodiments.
Figure 6B:
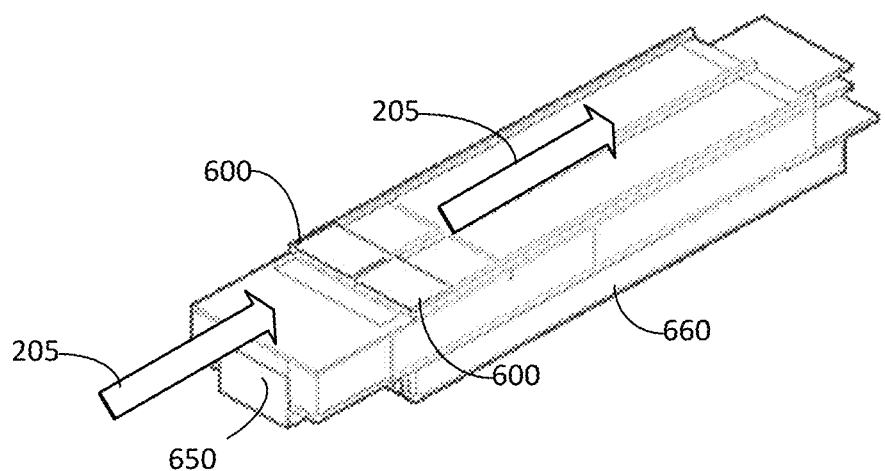
Figure 6C:
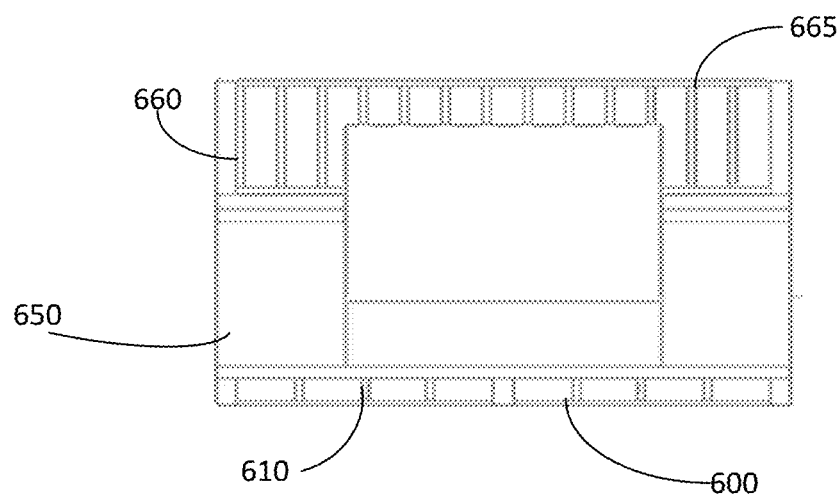

FIGS. 6A-C illustrate an EMC shield for a module device 650, according to various embodiments. For example, FIG. 6A includes an EMC shield 600 with an array of fins 610. In some examples, the EMC shield 600 is formed with 0.25 mm sheet metal, with bent fins to reduce an aperture at a heatsink inlet and allow for much fewer fins than would be traditionally needed to reduce EMC radiation (e.g., 3 fins per shield vs. 8 fins per integrated heatsink, etc.).

FIG. 6B is a bottom perspective view and FIG. 6C is a front facing view of the module device 650 with EMC shields 600. In some examples, the module device 650 is a variation of the module device 210 and includes a heatsink 660 and the various air flow channels formed between the module device 210 and the module cage 220, where the EMC shield is positioned in the recessed surface 211 to provide additional EMC protection. For example, the fins 610 of the installed EMC shield 600 in FIG. 6C prevent or reduce EMC radiation from emitting from the interior 140 via the air flow channels and recessed portions of the module.

In another example, shown in FIG. 6B, the module device 650 includes and the EMC shields 600 which provide a direct path between the air vent panel 115 and/or the intake notch vent opening 240 shown in FIG. 2A to provide cooling airflow 205 directly to the interior 140 without flowing through the module itself. The EMC shields 600 prevent EMC radiation from exiting the front portion of the module. As shown in FIG. 6C, the heatsink 660 includes many more fins 665 relative to the EMC shield 600. The additional fins may cause reduced airflow through the heatsink 660 and the module device 650. In some examples, the heatsink 660 may be replaced by the EMC shield 600 as shown in FIGS. 7A and 7B.

Figure 7A:
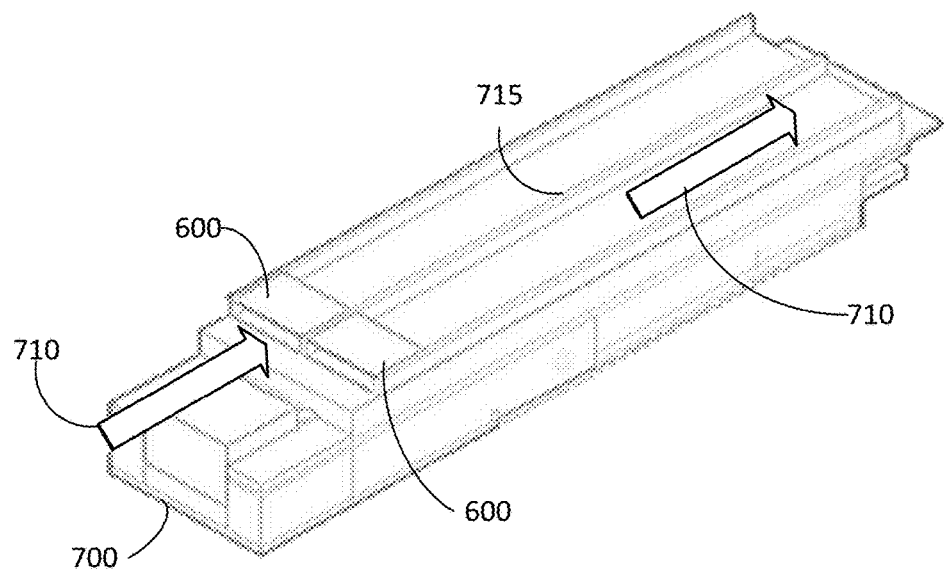
FIG. 7A-7B illustrate various views of a module device with EMC shields, according to various embodiments.
Figure 7B:
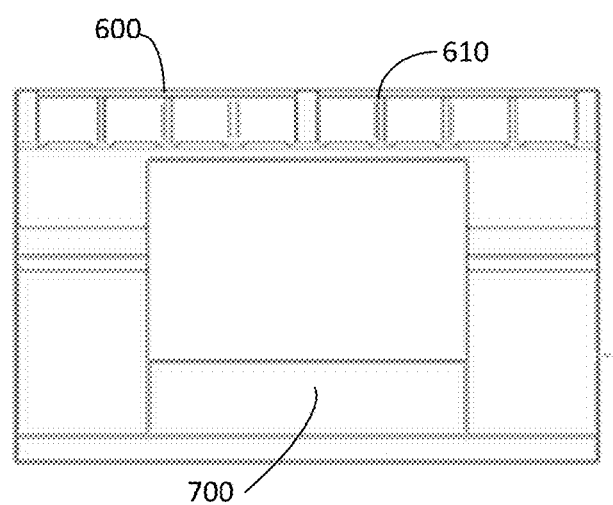

FIG. 7A is a top perspective view and FIG. 7B is a front facing view a module 700 with EMC shields 600. In some examples, the module 700 is a variation of the module device 210 and includes the various air flow channels, such as airflow channels 260 and 265, formed between the module device 210 and the module cage 220 described in relation to FIGS. 2A-B and 3A-B. In another example, the module 700 does not include the various air flow channels formed between the module device 210 and the module cage 220. In both examples, the module device 700 does not include a heatsink similar to the heatsink 355 and heatsink 660 and instead includes the EMC shields 600 shown in FIGS. 7A and 7B. For example, in some examples, the module 700 may produce low amounts of heat and does not require significant heat mitigation from a heatsink and includes a series of fins 715 with at least one EMC shield 600 positioned between the fins of the series of fins 715. The reduced number of fins 610 allow for low flow impedance of the airflow 710 through the module 700 and increased airflow into the interior 140. The EMC shield(s) 600 prevent EMI radiation from exiting the system 100 via the front portion of the module.

Figure 8A:
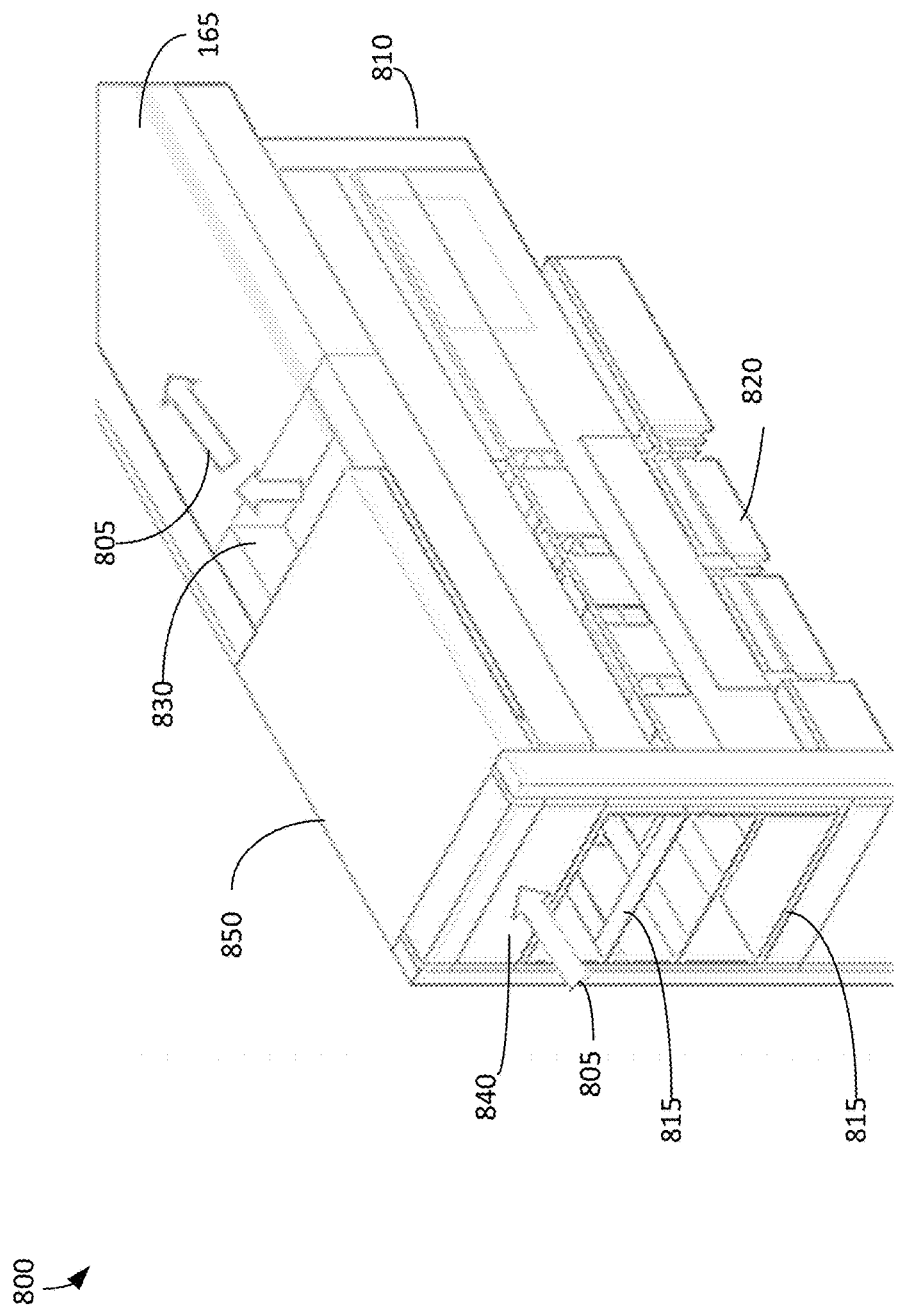
FIGS. 8A-8B illustrate various views of a module cage, according to various embodiments.
Figure 8B:
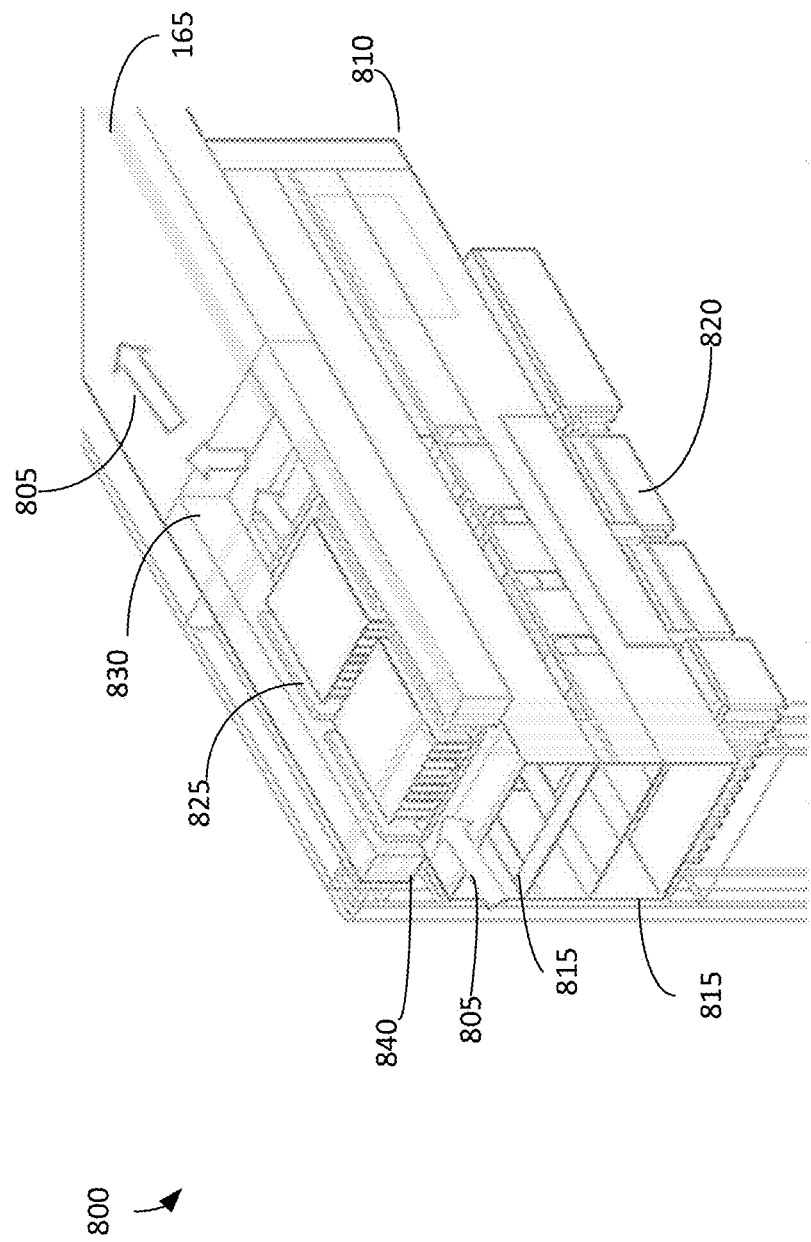

FIGS. 8A and 8B are bottom perspective views of a module cage 810, according to example embodiments. In some examples, the module cage 800 is a 2×1 pluggable optic module cage with heatsink on a top and a bottom of the cage. For example, the module cage 800 includes heatsinks 820 and 825 on opposite sides of the cage. In some examples, the cage 810 includes module openings 815, a vent opening 840 which allows for cooling airflow 805 to flow from the vent opening 840 through the heatsinks 825 through a notch formed in the platform 165. In some examples, the cooling airflow 805 also flows through air flow channels as described in relation to FIGS. 2B-2C. In another example, the cooling airflow 805 flows from the notch 830 to the interior 140. In some examples, the cage 810 includes a gasket 850 positioned over the heatsinks 825 (shown as transparent in FIG. 8B) to provide for directed airflow for the cooling airflow 805.

Figure 9A:
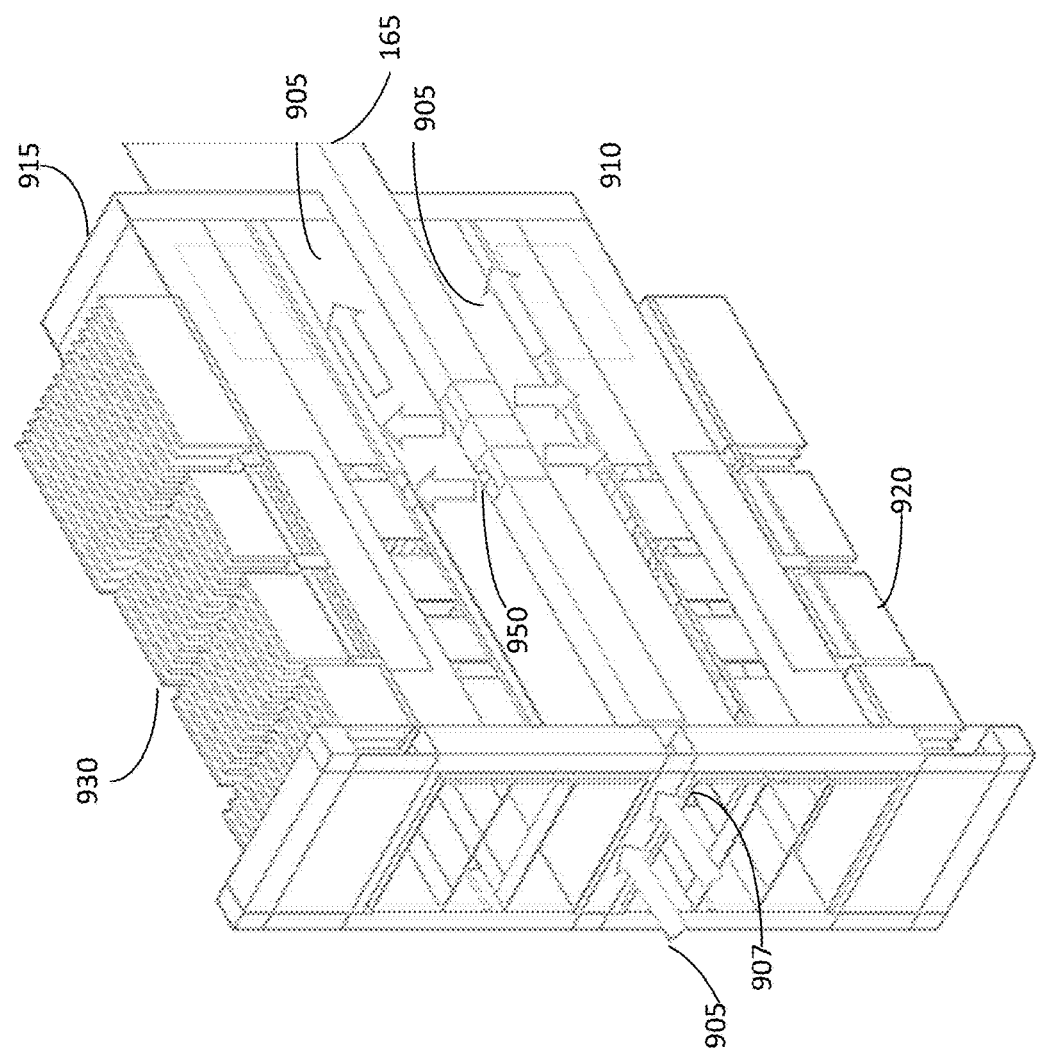
FIGS. 9A-9D illustrate various views of a module cage, according to various embodiments.
Figure 9B:
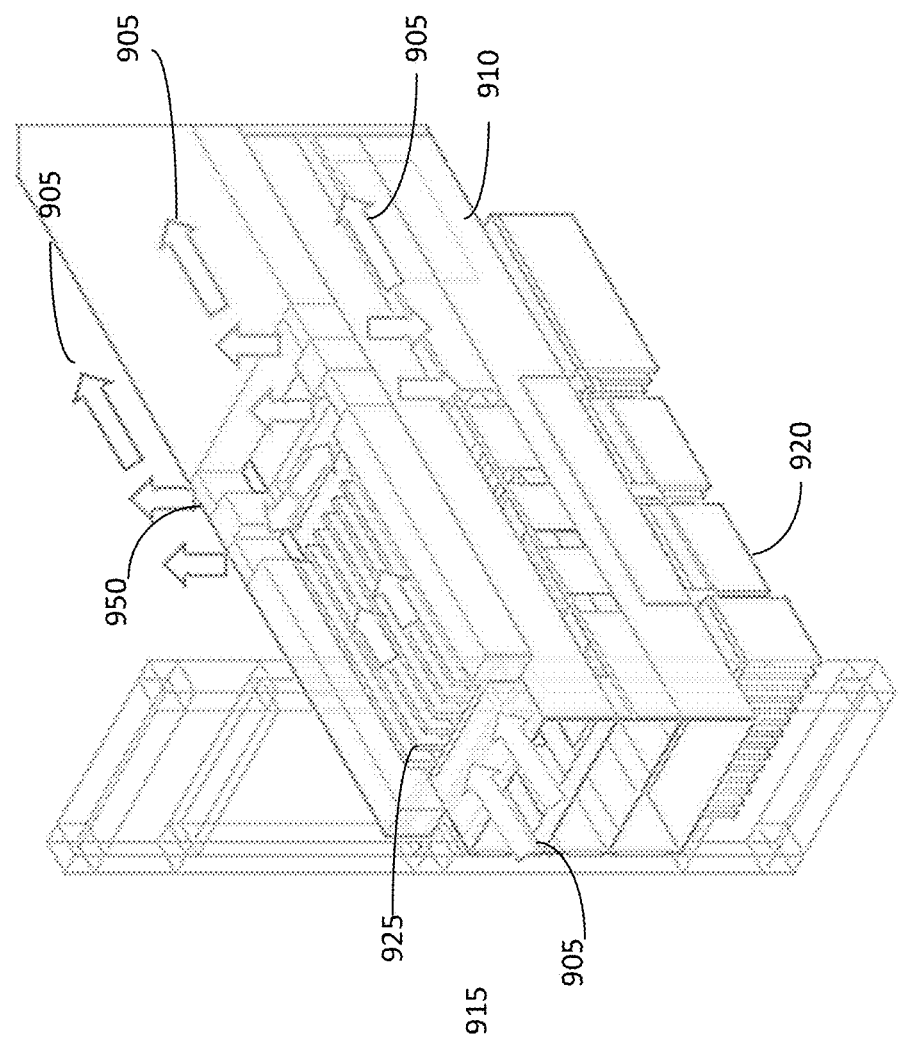
Figure 9C:
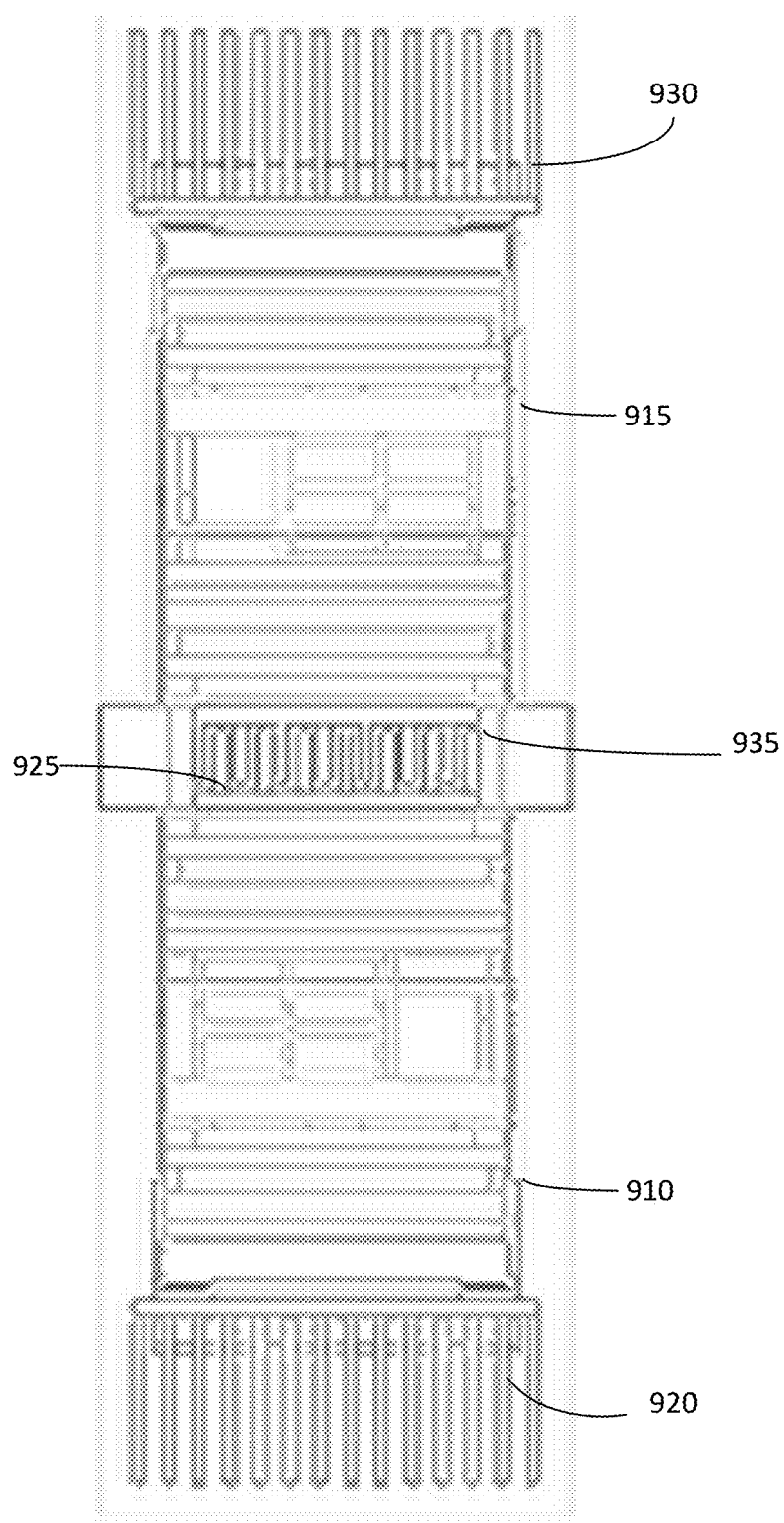
Figure 9D:
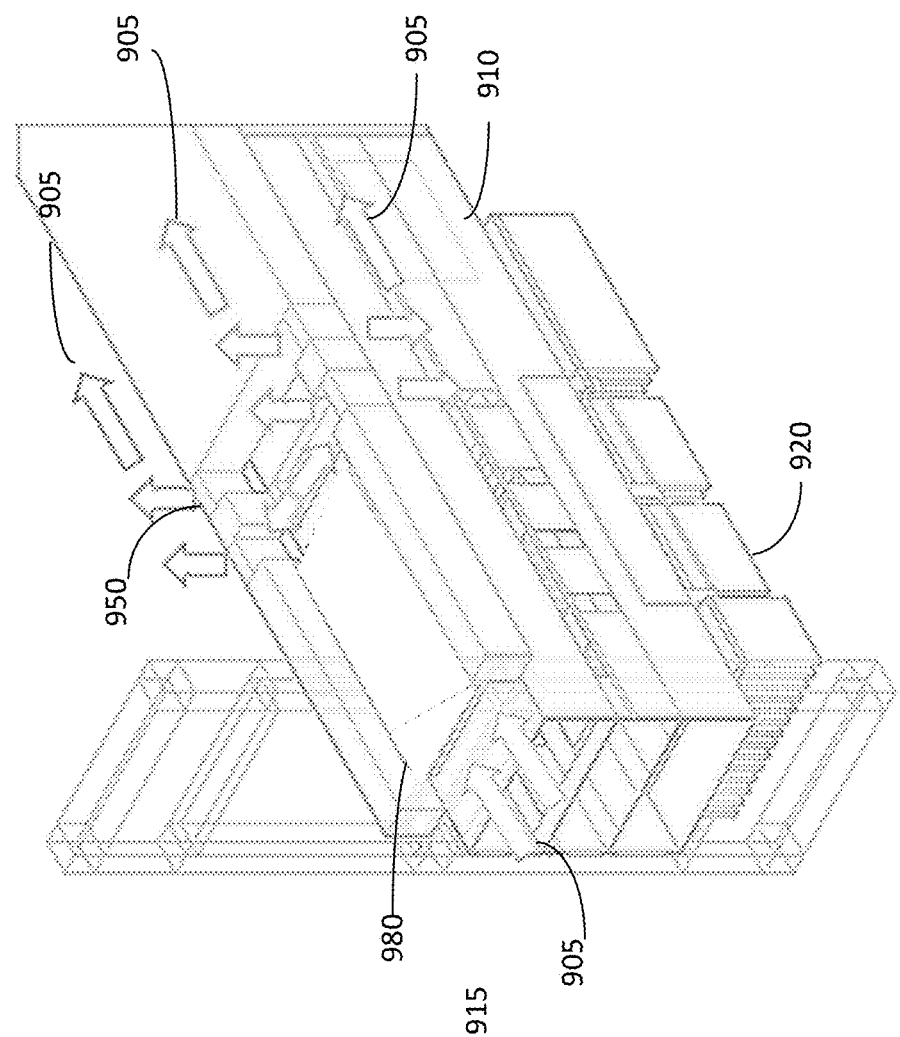

FIGS. 9A and 9B are side perspective views of a module cages, according to embodiments. In some examples, the module cages 910 and 915 are 2×1 pluggable optic module cages with a respective heatsink on a top and a bottom of the cage. For example, the module cage 910 includes heatsinks 920 and 925 on opposite sides of the cage. In some examples, the module cage 910 includes a vent opening 907 which allows for cooling flow 905 to flow from the vent opening 907 through the heatsinks 925 and 930 and through notches formed in the platform 165. In some examples, the cooling flow 905 also flows through air flow channels as described in relation to FIGS. 2B-2C. In another example, the cooling flow 905 flows from the notch 950 to the interior 140. In some examples, various fins of the heatsinks 925 and 935 are interleaved as shown in FIG. 9C.

For example, the heatsink 925 and 935 have extruded fin construction with offset so that the fins are interleaved when installed on opposite sides of the PCB board in a belly-to-bell mounting. In some examples, belly-to-belly mounting blocks the primary exhaust route used in single-sided mounting application shown above, the channel cutout in platform 165 includes the notches 950 along sides that extend beyond the cage footprint that allows air to exhaust from heatsink fins to the system fans at rear of the chassis 105. In some examples, the notches 950 are located between the mounting holes/press fit pins for the module cages 910 and 915. In another example, shown in FIG. 9D, the module cages 910 and 915 only include the respective heatsinks 920 and 930 such that air flow channel 980 shown provides the cooling flow 905 to the notches 950, without passing through heatsinks.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. A module assembly comprising:
   a module cage comprising:
      a first cage sidewall comprising an intake notch formed through the first cage sidewall on a first side of the first cage sidewall;
      a second cage sidewall; and
      an exhaust sidewall, where the first cage sidewall, the second cage sidewall, and the exhaust sidewall define an interior cavity;
   a module device positioned in the interior cavity of the module cage and comprising:
      a first recessed portion formed on a first module sidewall of the module device, where a first airflow channel is formed from the intake notch and is between the first recessed portion and the first cage sidewall; and
      a second recessed portion formed on a second module sidewall of the module device, where a second airflow channel is formed between the second recessed portion and the second cage sidewall, where the first airflow channel and the second airflow channel provide a cooling airflow path from the intake notch to the exhaust sidewall.

2. The module assembly of claim 1, further comprising a heatsink positioned on a third sidewall of the module device, wherein the heatsink comprises:
   a series of fins; and
   at least one electromagnetic compatibility (EMC) shield positioned between the series of fins.

3. The module assembly of claim 2, wherein the heatsink provides primary heat mitigation to the module device, and wherein the cooling airflow path provides heat mitigation to an external device.

4. The module assembly of claim 1, wherein the module device further comprises:
   an electromagnetic compatibility (EMC) shield positioned in the first recessed portion between the second module sidewall and the first module sidewall.

5. The module assembly of claim 1, wherein the module assembly is positioned on a mounting platform, wherein the mounting platform comprises:
   a base notch formed in the mounting platform, wherein the intake notch of the module cage is aligned to the base notch, wherein the cooling airflow path further passes from the base notch to the intake notch and the first airflow channel.

6. The module assembly of claim 1, wherein each of the first module sidewall and the second module sidewall further comprises at least one vent hole through a sidewall material to provide cooling airflow to an interior of the module device.

7. The module assembly of claim 1,
   wherein the first recessed portion comprises a first recessed surface recessed at a first distance from a first surface of the first module sidewall, wherein the first distance is 0.25 millimeters, and
   wherein the second recessed portion comprises a second recessed surface recessed at a second distance from a first surface of the second module sidewall, wherein the second distance is 0.5 millimeters.

8. A system comprising:
   a chassis;
   an external connection system positioned on a first end of the chassis and comprising:
      a faceplate comprising:
         a module opening formed through the faceplate; and
         a vent opening formed through the faceplate and positioned adjacent to the module opening;
      a mounting platform comprising a vent notch formed on the mounting platform, where the vent notch is positioned adjacent to the vent opening;
      a module assembly positioned in the module opening of the faceplate and attached to the mounting platform, the module assembly comprising:
         a module cage comprising:
            a first cage sidewall comprising an intake notch formed through the first cage sidewall on a first side of the first cage sidewall;
            a second cage sidewall; and
            an exhaust sidewall, where the first cage sidewall, the second cage sidewall, and the exhaust sidewall define an interior cavity;
         a module device positioned in the interior cavity of the module cage and comprising:
            a heatsink positioned on a first module sidewall of the module device;
            a first recessed portion formed on a second module sidewall of the module device opposite the first module sidewall, where a first airflow channel is formed from the intake notch and between the first recessed portion and the first cage sidewall; and
            a second recessed portion formed on a third module sidewall of the module device, where a second airflow channel is formed between the second recessed portion and the second cage sidewall, where the first airflow channel and the second airflow channel provide a cooling airflow path from the intake notch to the exhaust sidewall.

9. The system of claim 8, further comprising:
   at least one heat generating system component positioned in an internal portion of the chassis; and
   at least one fan positioned to provide a cooling system airflow through the chassis, wherein a cooling airflow flowing along the cooling airflow path provides an airflow at an external ambient temperature to the at least one heat generating system component.

10. The system of claim 9, wherein the heatsink provides primary heat mitigation to the module device, and wherein the cooling airflow path provides heat mitigation to the at least one heat generating system component.

11. The system of claim 8, wherein the heatsink comprises:
   a series of fins; and
   at least one electromagnetic compatibility (EMC) shield positioned between fins of the series of fins.

12. The system of claim 8, wherein the module device further comprises:
   an electromagnetic compatibility (EMC) shield positioned in the first recessed portion between the second module sidewall and the first module sidewall.

13. The system of claim 8, wherein the module assembly is positioned on the mounting platform, wherein the mounting platform comprises:
   a base notch formed in mounting platform, wherein the intake notch of the module cage is aligned to the base notch, wherein the cooling airflow path further passes from the base notch to the intake notch and the first airflow channel.

14. The system of claim 8, wherein each of the first module sidewall and the second module sidewall further comprises at least one vent hole through a sidewall material to provide cooling airflow to an interior of the module device.

15. The system of claim 8,
wherein the first recessed portion comprises a first recessed surface recessed at a first distance from a first surface of the first module sidewall, wherein the first distance is 0.25 millimeters, and
wherein the second recessed portion comprises a second recessed surface recessed at a second distance from a first surface of the second module sidewall, wherein the second distance is 0.5 millimeters.

16. A module assembly comprising:
a module cage;
an optical module positioned in an interior cavity of the module cage and comprising:
 a heatsink positioned on a first module sidewall of the optical module and comprising:
  a first series of fins;
  a second series of fins; and
  at least one electromagnetic compatibility (EMC) shield positioned between fins of the series of fins, wherein the first series of fins, the second series of fins, and the EMC shield contact a same planar surface of the optical module.

17. The module assembly of claim 16, wherein
the module cage comprises:
 a first cage sidewall comprising an intake notch formed through the first cage sidewall on a first side of the first cage sidewall;
 a second cage sidewall; and
 an exhaust sidewall, where the first cage sidewall, the second cage sidewall, and the exhaust sidewall define the interior cavity; and
where the optical module further comprises:
 a first recessed portion formed on a second module sidewall of the optical module opposite the first module sidewall, where a first airflow channel is formed from the intake notch and is between the first recessed portion and the first cage sidewall; and
 a second recessed portion formed on a third module sidewall of the optical module, where a second airflow channel is formed between the second recessed portion and the second cage sidewall, where the first airflow channel and the second airflow channel provide a cooling airflow path from the intake notch to the exhaust sidewall.

18. The module assembly of claim 17, wherein the optical module further comprises:
an EMC shield positioned in the first recessed portion between the second module sidewall and the first module sidewall.

19. The module assembly of claim 17, wherein the module assembly is positioned on a mounting platform, wherein the mounting platform comprises:
a base notch formed in the mounting platform, wherein the intake notch of the module cage is aligned to the base notch, wherein the cooling airflow path further passes from the base notch to the intake notch and the first airflow channel.

20. The module assembly of claim 17,
wherein the first recessed portion comprises a first recessed surface recessed at a first distance from a first surface of the first module sidewall, wherein the first distance is 0.25 millimeters, and
wherein the second recessed portion comprises a second recessed surface recessed at a second distance from a first surface of the second module sidewall, wherein the second distance is 0.5 millimeters.

\* \* \* \* \*